United States Patent
Shanmugam et al.

(10) Patent No.: US 11,281,454 B2
(45) Date of Patent: Mar. 22, 2022

(54) MICROCODE UPDATE SYSTEM

(71) Applicant: Dell Products L.P., Round Rock, TX (US)

(72) Inventors: Murali Manohar Shanmugam, Cedar Park, TX (US); Wei Liu, Austin, TX (US); Juan Francisco Diaz, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 16/778,064

(22) Filed: Jan. 31, 2020

(65) Prior Publication Data

US 2021/0240468 A1    Aug. 5, 2021

(51) Int. Cl.
*G06F 8/658*    (2018.01)
*G06F 8/65*    (2018.01)

(52) U.S. Cl.
CPC ............. *G06F 8/658* (2018.02); *G06F 8/66* (2013.01)

(58) Field of Classification Search
CPC .............. G06F 8/658; G06F 8/65; G06F 8/66
See application file for complete search history.

(56) References Cited

U.S. PATENT DOCUMENTS

| | | | |
|---|---|---|---|
| 5,371,848 A * | 12/1994 | Casey .................. | G06F 9/4401 714/E11.188 |
| 5,983,337 A * | 11/1999 | Mahalingaiah .......... | G06F 8/66 712/209 |
| 6,789,158 B2 * | 9/2004 | Takahashi ................ | G06F 8/60 711/103 |
| 10,282,190 B2 * | 5/2019 | Dailey ...................... | G06F 8/65 |
| 2010/0180104 A1 * | 7/2010 | Henry ....................... | G06F 9/32 712/208 |
| 2016/0180099 A1 * | 6/2016 | Potlapally ............. | H04L 9/0838 713/189 |
| 2018/0157475 A1 * | 6/2018 | Dailey ...................... | G06F 8/65 |
| 2021/0141633 A1 * | 5/2021 | Fox ........................... | G06F 8/60 |

OTHER PUBLICATIONS

Benjamin Kollenda et al., "An Exploratory Analysis of Microcode as a Building Block for System Defenses", [Online], pp. 1649-1666, [Retrieved from Internet on Nov. 5, 2021], <https://dl.acm.org/doi/pdf/10.1145/3243734.3243861>, (Year: 2018).*

(Continued)

*Primary Examiner* — Ziaul A Chowdhury
(74) *Attorney, Agent, or Firm* — Joseph Mencher (57) ABSTRACT

A microcode update system includes at least one memory device having a code region and a data region, and a microcode update engine that receives a microcode update, and writes the microcode update to the data region of the at least one memory device. Subsequent to writing the microcode update to the data region of the at least one memory device, the microcode update engine utilizes initialization code in the code region of the at least one memory device to perform initialization operations. During a microcode update portion of the initialization operations, the microcode update engine identifies the microcode update in the data region of the at least one memory device, and performs microcode update operations using the microcode update in the data region of the at least one memory device.

12 Claims, 6 Drawing Sheets

(56) References Cited

OTHER PUBLICATIONS

Nikola Zlatanov, "Booting an Intel System Architecture", [Online], pp. 1-19, [Retrieved from Interent on Nov. 5, 2021], <https://s3-US-west-1.amazonaws.com/groupsioattachments/22095/73996739/22306/0?>, (Year: 2015).*

Daming D. Chen et al., "Security Analysis of x86 Processor Microcode", [Online], pp. 1-23, [Retrieved from Interent on Nov. 5, 2021], <http://lux.dmcs.pl/ak/2014_paper_microcode.pdf>, (Year: 2014).*

* cited by examiner

MICROCODE UPDATE SYSTEM

BACKGROUND

The present disclosure relates generally to information handling systems, and more particularly to updating microcode used by information handling systems As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, perform initialization operations in order to initialize the computing device so that it may enter a runtime environment. As will be appreciated by one of skill in the art in possession of the present disclosure, the initialization of a computing device may include the performance of initialization operations by a Basic Input/Output System (BIOS) engine that is provided by firmware that is used to perform hardware initialization during a boot process (e.g., a Power On Self Test (POST)) for the computing device, runtime services for an operating system and other programs that run on the computing device, as well as a variety of other functionality that would be apparent to one of skill in the art in possession of the present disclosure. As will be appreciated by one of skill in the art in possession of the present disclosure, microcode updates or "patches" may be provided on computing devices in order to secure vulnerabilities associated with the computing device (e.g., Central Processing Unit (CPU) side channel vulnerabilities and/or other low-level firmware vulnerabilities known in the art), provide performance enhancements for components (e.g., the CPU) in the computing device, fix bugs associated with the computing device, and/or in a variety of other situations known in the art. However, the conventional updating of microcode in a computing device raises some issues.

For example, conventional microcode updates are provided as part of a BIOS engine update for the BIOS engine, with the microcode updates integrated with the BIOS engine update and delivered via a BIOS engine update delivery mechanism. However, different computing device generations, and different computing device platforms in any particular computing device generation, may utilize BIOS engines provided using different BIOS code, and thus the updating of microcode for the computing devices within a computing device generation or across computing device generations requires the creation of a BIOS update for each group of computing devices that utilize a BIOS engine provided via particular BIOS code. As such, a microcode update for several computing device generations may require the generation of different BIOS engine updates for hundred(s) of computing device platforms, including computing device platforms that are near the ends of their lifecycles, and the validation and delivery of such BIOS engine updates requires significant effort, time, and associated costs, while increasing overhead costs associated with computing device users revalidating the BIOS engine updates and providing them on each of their computing devices. Further still, in some situations, a user of a computing device may wish to implement a BIOS engine update without a microcode update (e.g., when the microcode update may cause decreased performance of the computing device), but conventional microcode update systems do not provide the ability to separate the BIOS engine update and the microcode update, and thus such users must either apply the microcode update, or disregard the BIOS engine update.

Accordingly, it would be desirable to provide a microcode update system that addresses the issues discussed above.

SUMMARY

According to one embodiment, an Information Handling System (IHS) includes a processing system that is configured to execute instructions that cause the processing system to provide a microcode update engine that is configured to: receive a microcode update; write the microcode update to a data region of at least one memory device; perform, subsequent to writing the microcode update to the data region of the at least one memory device and utilizing initialization code in a code region of the at least one memory device, initialization operations; identify, during a microcode update portion of the initialization operations, the microcode update in the data region of the at least one memory device; and perform microcode update operations using the microcode update in the data region of the at least one memory device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
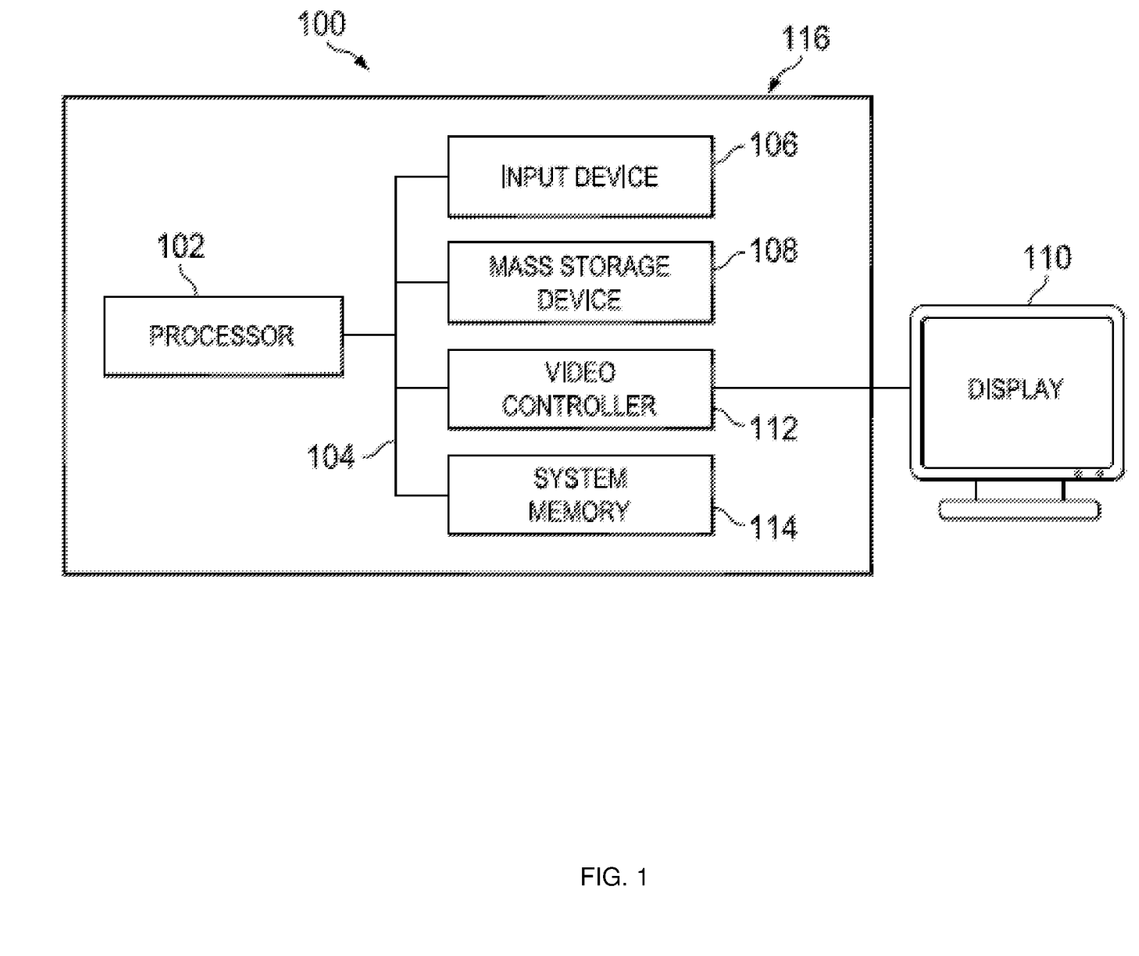
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
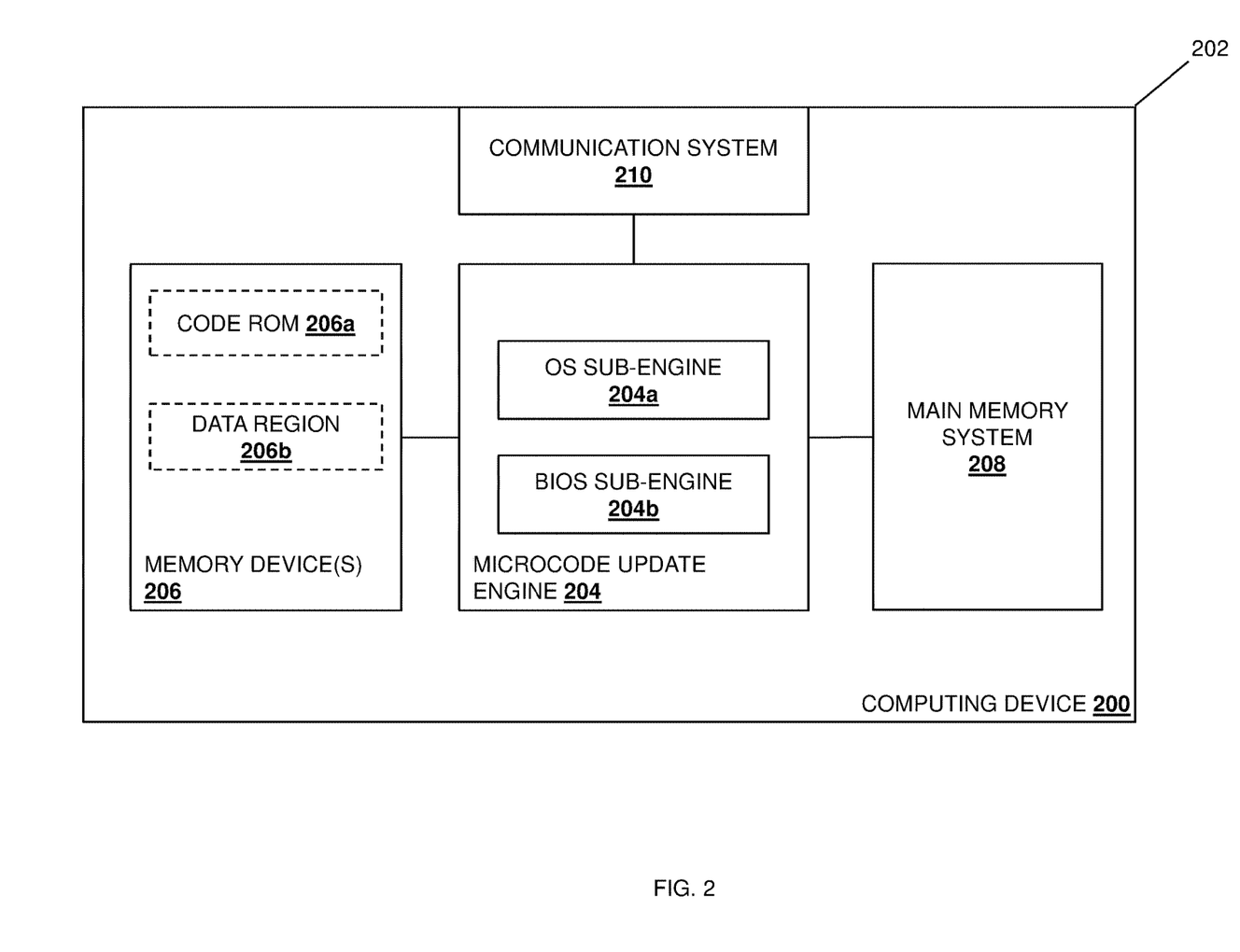
FIG. 2 is a schematic view illustrating an embodiment of a computing device that includes the microcode update system of the present disclosure.

Referring now to FIG. 2, an embodiment of a computing device 200 is illustrated that may provide the microcode update system of the present disclosure. In an embodiment, the computing device 200 may be provided by the IHS 100 discussed above with reference to FIG. 1 and/or may include some or all of the components of the IHS 100, and in specific examples may be provided by a server device, a desktop computing device, a laptop/notebook computing device, a tablet computing device, a mobile phone, and/or other computing devices that would be apparent to one of skill in the art in possession of the present disclosure. Furthermore, while one of skill in the art in possession of the present disclosure will recognize that the computing device 200 is illustrated and discussed below as being provided by server device, the functionality of the computing device 200 discussed below may be provided by other devices that are configured to operate similarly as computing device 200 discussed below. In the illustrated embodiment, the computing device 200 includes a chassis 202 that houses the components of the computing device 200, only some of which are illustrated below.

For example, the chassis 202 may house a processing system (not illustrated, but which may include the processor 102 discussed above with reference to FIG. 1) that may execute instructions that cause the processing system to provide a microcode update engine 204 that, in the illustrated embodiment, includes an Operating System (OS) sub-engine 204a and a Basic Input/Output System (BIOS) sub-engine 204b. As will be appreciated by one of skill in the art in possession of the present disclosure, the OS sub-engine 204a may be configured to provide an operating system that performs a variety of runtime operations for the computing device 200 while the computing device 200 is in a runtime environment, while the BIOS sub-engine 204b may be configured to provide a BIOS that performs initialization operations as well as some runtime operations that for the computing device 200. However, while described as providing a BIOS engine that is configured to perform BIOS functionality in many of the examples provided below, one of skill in the art in possession of the present disclosure will recognize that the BIOS engine described herein may be provided by a Universally Extensible Firmware Interface (UEFI) engine that provides a software interface between an operating system and platform firmware, and that includes UEFI functionality that has been provided to replace BIOS functionality. As such, one of skill in the art in possession of the present disclosure will appreciate that the microcode update engine 204 may be provided in a variety of manners and using a variety of sub-engines while remaining within the scope of the present disclosure.

The chassis 202 may also house one or more initialization memory device(s) 206 that are coupled to the microcode update engine 204 (e.g., via a coupling between the memory device(s) 206 and the processing system) and that, in the illustrated embodiment, include an initialization "code" Read Only Memory (ROM) 206a that includes the code or other instructions for providing an initialization engine. Continuing with the example discussed above, the memory device(s) 206 may be provided by a Serial Peripheral Interface (SPI) flash memory device or other persistent, non-volatile memory device that provides the code ROM 206a that includes code or other instructions for providing the BIOS sub-engine 204b described herein. Furthermore, the memory device(s) 206 may also include a data region 206b that is configured to store any of a variety of data that would be apparent to one of skill in the art in possession of the present disclosure. Continuing with the example discussed above, the memory device(s) 206 may be provided by the SRI flash memory device or other persistent, non-volatile memory device that provides the data region 206b. One of skill in the art in possession of the present disclosure will recognize that the examples below describe a single memory device 206 (e.g., a SRI flash memory device) that includes the code ROM 206a and the data region 206b. However, the provisioning of different memory devices 206 to provide each of the code ROM 206a and the data region 206b will fall within the scope of the present disclosure as well.

For example, the memory devices 206 may include a first memory device (e.g., a first SRI flash memory device) that provides the code ROM 206a storing the initialization code (BIOS code) discussed above. Furthermore, the memory devices 206 may also include a second memory device (e.g., a second SRI flash memory device) that provides the data region 206b via an initialization "data" Read Only Memory (ROM) that includes data utilized by an initialization engine during initialization operations and runtime operations. For example, the data ROM discussed above may include data utilized the BIOS sub-engine 204b discussed above during initialization operations and runtime operations, which one of skill in the art in possession of the present disclosure in will appreciate may include UEFI variables, Non-Volatile Random Access Memory (NVRAM) attributes, Outside Equipment Manufacturer (OEM) identifiers, and/or any other initialization data known in the art. As such, while a single memory device 206 is described below as providing the code ROM 206a and data region 206b, different memory devices providing the code ROM 206a and the data region 206b in a data ROM will fall within the scope of the present disclosure as well.

The chassis 202 may also house a main memory system 216 that is coupled to the microcode update engine 204 (e.g., via a coupling between the main memory system 208 and the processing system), and that may be provided by Dynamic Random Access Memory (DRAM) devices and/or other main memory subsystems that would be apparent to one of skill in the art in possession of the present disclosure. The chassis 202 may also house a communication system 210 that is coupled to the microcode update engine 204 (e.g., via a coupling between the communication system 210 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
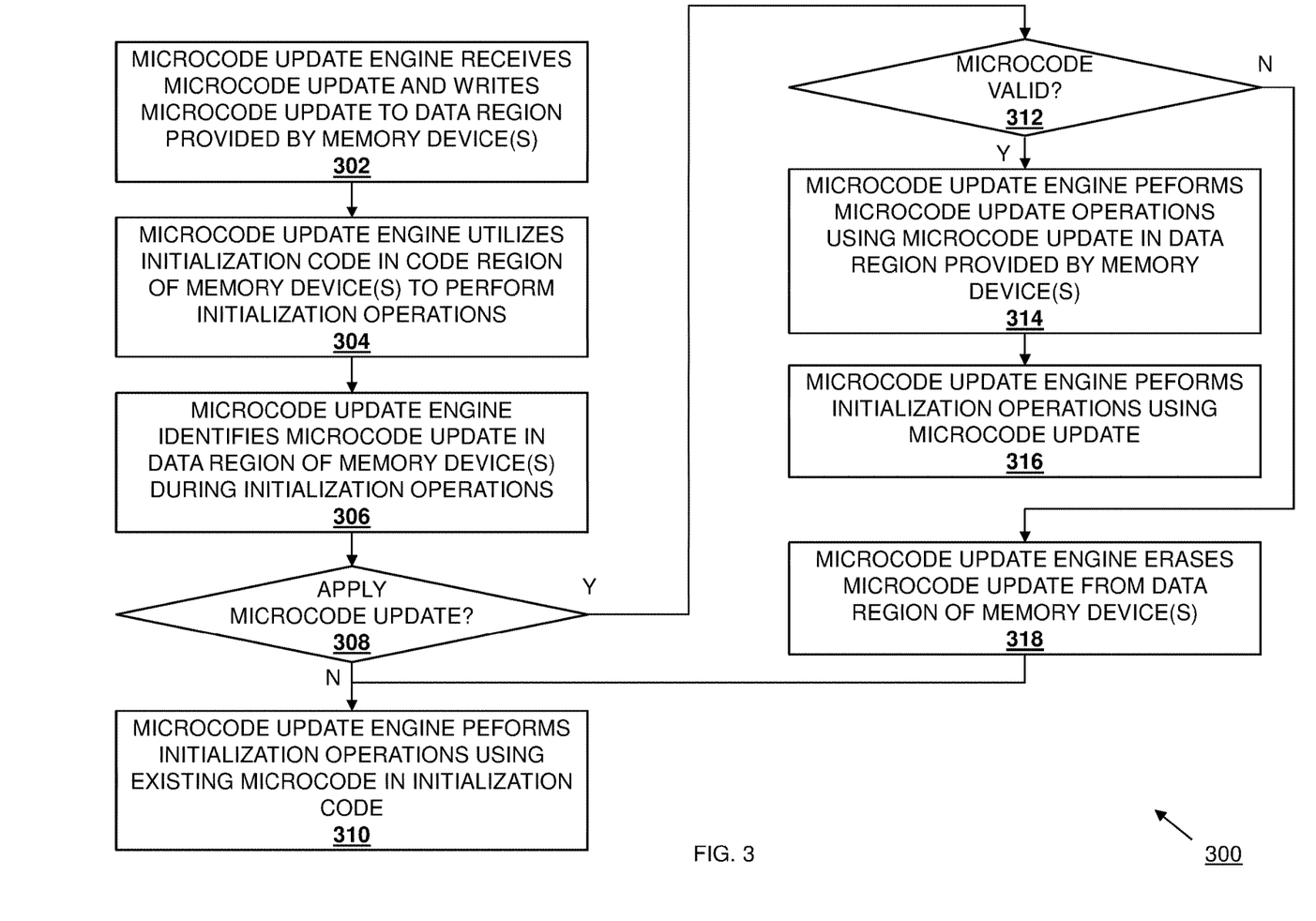
FIG. 3 is a flow chart illustrating an embodiment of a method for updating microcode.

Referring now to FIG. 3, an embodiment of a method 300 for updating microcode is illustrated. As discussed below, the systems and methods of the present disclosure provide for "standalone" microcode updates that are separate and distinct from initialization engine updates, which allows for the updating of microcode in a computing device without the need to update the initialization engine in that computing device, while also freeing users to update the initialization engine in the computing device without requiring that the microcode utilized by that computing device be updated as well. For example, a memory device in the computing device may include a code region and a data region, and a microcode update engine coupled to the memory device may receive a microcode update, and write the microcode update to the data region of the memory device. Subsequently and in response to an initialization of the computing device, the microcode update engine may utilize initialization code in the code region of the memory device to perform initialization operations, identify the microcode update in the data region of the memory device during a microcode update portion of the initialization operations, and perform microcode update operations using the microcode update in the data region of the at least one memory device. As such, microcode updates may be provided for different computing device platforms within a computing device generation, and across computing device generations, without the need to generate initialization engine updates for each computing device platform, while any user of a computing device may decline to update microcode (e.g., when doing so would reduce the performance of the computing device) when updating the initialization engine for the computing device.

Figure 4A:
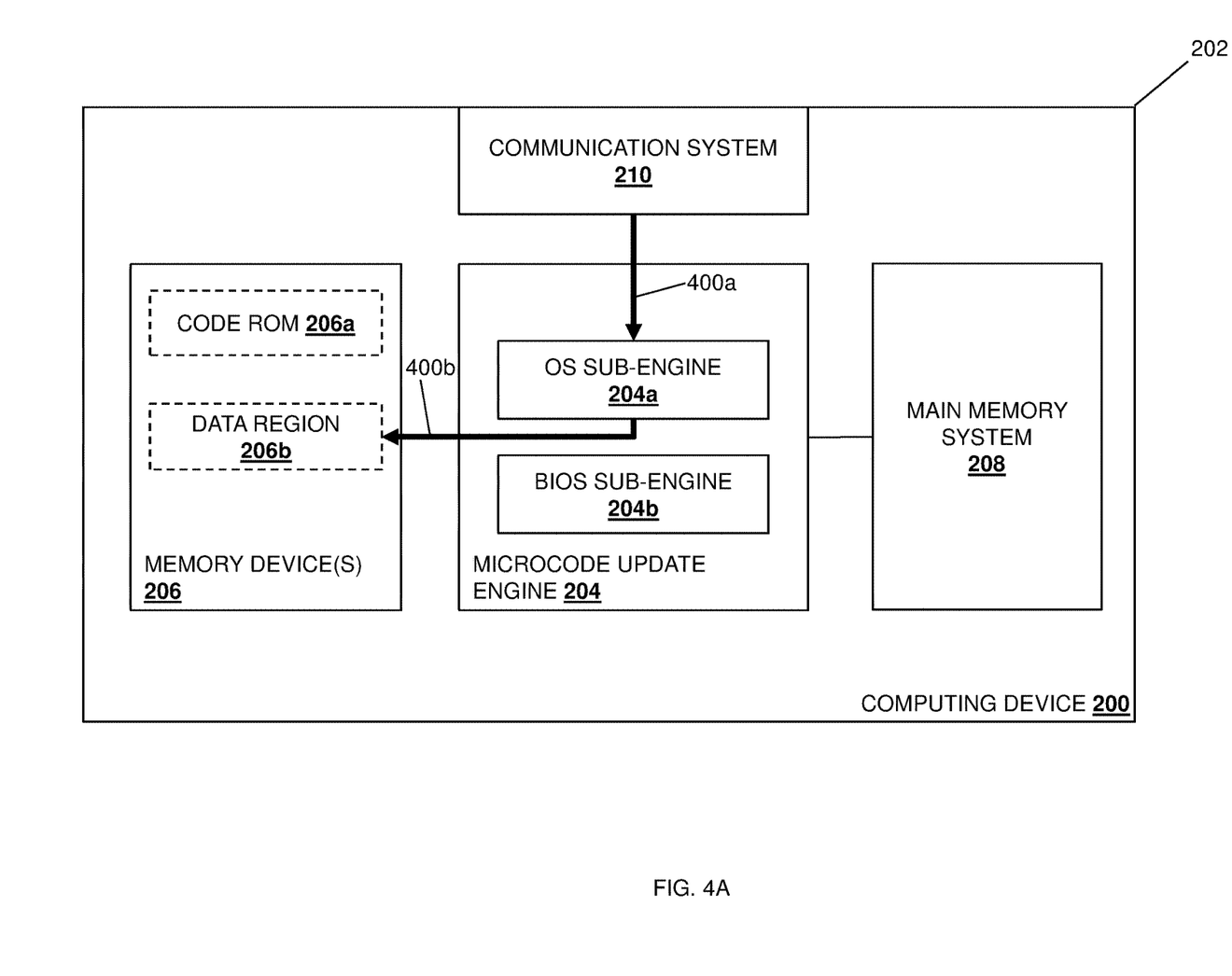
FIG. 4A is a schematic view illustrating an embodiment of the computing device of FIG. 2 operating during the method of FIG. 3.

The method 300 begins at block 302 where a microcode update engine receives a microcode update and writes the microcode update to a data region provided by one or more memory device(s). In an embodiment, at block 302, the microcode update engine 204 in the computing device 200 may receive a microcode update and write that microcode update to the memory device(s) 206. For example, FIG. 4A illustrates how the OS sub-engine 204a in the microcode update engine 204 may operate to perform microcode update receiving operations 400a (e.g., while the computing device 200 is in a runtime environment) in order to receive a microcode update via the communication system 210 and, in response, perform write operations 400b to write the microcode update to the data region 206b in the memory device(s) 206. However, while discussed as being received and written to the data region 206b of the memory device(s) 206 while the computing device 200 is in the runtime environment, in some embodiments the microcode update may be received and/or written to the data region 206b in the memory device(s) 206 at other times (e.g., in an initialization environment) while remaining within the scope of the present disclosure as well.

As will be appreciated by one of skill in the art in possession of the present disclosure, a computing device manufacturer such as DELL® Inc. of Round Rock, Tex., United States, may generate a microcode update for computing devices included in a computing device platform, a computing device generation, and/or other computing devices grouping known in the art in order to, for example, secure vulnerabilities associated with the computing device 200 (e.g., Central Processing Unit (CPU) side channel vulnerabilities and/or other low-level firmware vulnerabilities known in the art), provide performance enhancements for components (e.g., the CPU) in the computing device 200, fix bugs associated with the computing device 200, and/or in a variety of other microcode update situations known in the art. Thus, the microcode updates discussed below may be considered "standalone" microcode updates that only provide for the updating of microcode utilized by the computing device 200 (e.g., a CPU in that computing device 200), rather than included in an initialization engine update (e.g., a BIOS engine update) that provides for the updating of an initialization engine (e.g., the BIOS sub-engine 204b) in the computing device 200. For example, a standalone microcode update may be provided via a software packet containing a microcode payload for the computing device 200, along with the necessary meta data for the receiving software on the computing device 200 (e.g., the operating system) and the initialization code (e.g., the BIOS code). As discussed below, the computing device manufacturer may sign the microcode update (e.g., by signing a microcode update package) with a certificate, key, or other security element in order to allow for validation operations by the computing devices that receive that microcode update. As such, the computing device manufacturer may transmit the microcode update via a network such as the Internet such that the microcode update may be received by computing devices similarly as illustrated in FIG. 4A. However, while a few specific examples are described, other reasons and techniques for providing the microcode updates described here will fall within the scope of the present disclosure as well.

As discussed above, in some embodiments, the memory device(s) 206 may be provided by a single memory device (e.g., a SRI memory device) that provides both the code ROM 206 (or other code region) and the data region 206*b*, and the OS sub-engine 204*a* may operate to receive the microcode update and write that microcode update to the data region of that memory device 206. In a specific example, the write operations 400*b* performed by the OS sub-engine 204*a* may include writing the microcode update to a Unified Extensible Firmware Interface (UEFI) variable in the data region 206*b* provided by the memory device 206, although the write operations 400*b* performed by the OS engine 204*a* may include writing the microcode update as a data Binary Large OBject (BLOB) in the data region 206*b* of the memory device 206, as well as any other write operations that would be apparent to one of skill in the art in possession of the present disclosure. However, in other embodiments, the memory device(s) 206 may include a first memory device (e.g., a first SRI memory device) providing the code ROM 206*a*, and a second memory device (e.g., a second SRI memory device) providing the data region 206*b* as a data ROM or other data storage area, and the write operations 400*b* performed by the OS sub-engine 204*a* may include writing the microcode update to a UEFI variable or as a data BLOB in the data region 206*b*/data ROM of the second memory device, as well as any other write operations that would be apparent to one of skill in the art in possession of the present disclosure In some embodiments, the microcode update may include a plurality of microcode modules that are wrapped in a package with header information, signed by the computing device manufacturer using a security key, and transmitted to the computing device 200 as the microcode update package referenced above. As such, upon receiving the microcode update package, the OS sub-engine 204*a* may write the microcode update package to the data region 206*b* in the memory device 206 as an authenticated UEFI variable, an authenticated data BLOB, and/or other authenticated information that would be apparent to one of skill in the art in possession of the present disclosure. However, while several different examples of standalone microcode updates, and the writing of such microcode updates, to a data region in a memory device have been described, one of skill in the art in possession of the present disclosure will appreciate that standalone microcode updates may vary and may be written to data regions like those discussed above in a variety of manners that will fall within the scope of the present disclosure as well.

Figure 4B:
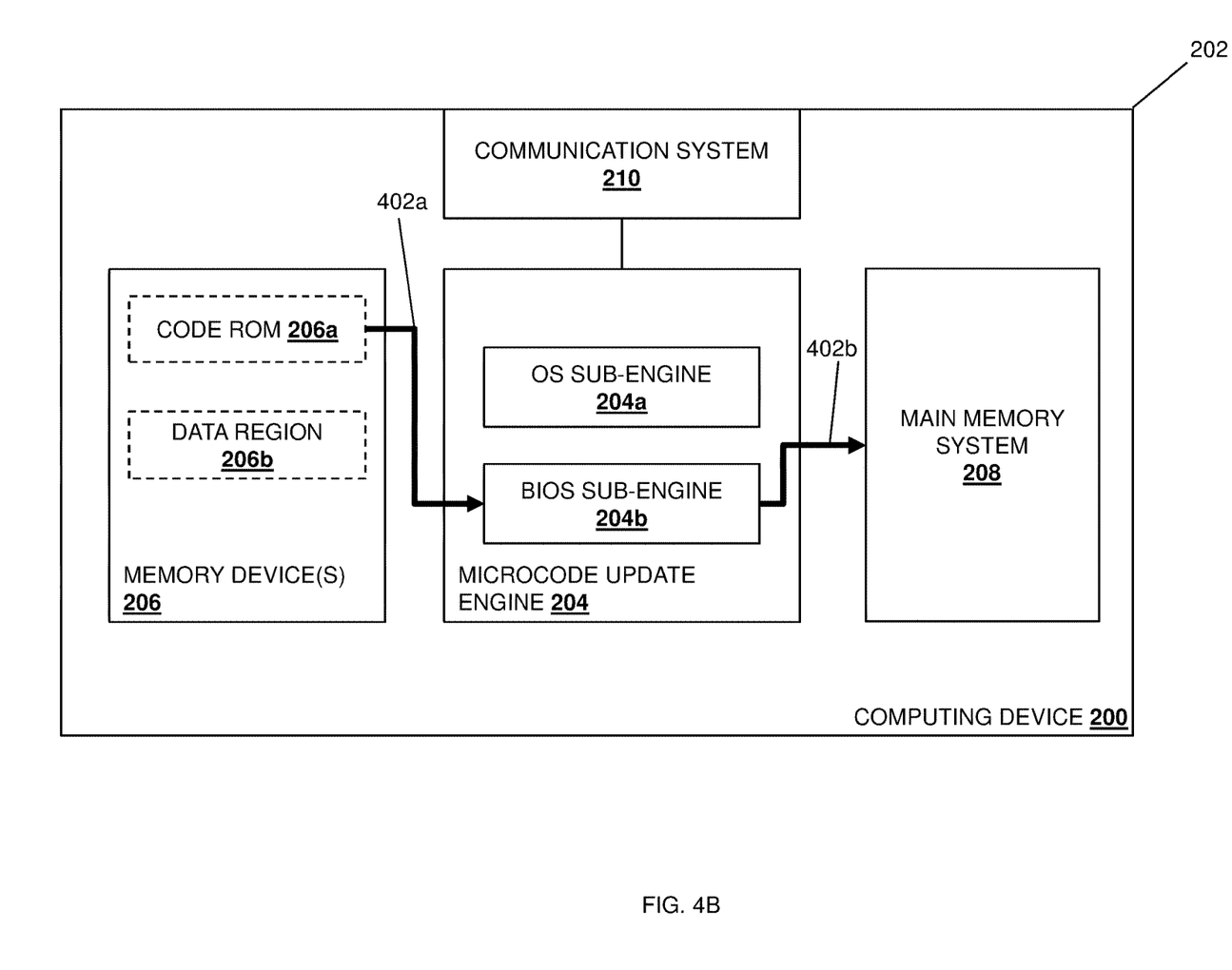
FIG. 4B is a schematic view illustrating an embodiment of the computing device of FIG. 2 operating during the method of FIG. 3.

The method 300 then proceeds to block 304 where the microcode update engine utilizes initialization code stored in a code region of the memory device(s) to perform initialization operations. In an embodiment, at block 404, the computing device 200 may be powered on, booted, reset, and/or otherwise initialized and, in response, the microcode update engine 204 may operate to utilize initialization code stored in the code ROM 206*a* provided by the memory device(s) 206 to perform initialization operations. One of skill in the art in possession of the present disclosure will appreciate that upon initialization of the computing device 200, a chipset in the processing system in the computing device 200 may operate to utilize initialization code (e.g., BIOS code) stored in the code ROM 206*a* provided by the memory device(s) 206 (e.g., an SPI memory device) in order to provide an initialization engine (e.g., the BIOS sub-engine 204*b*), and that initialization engine may then copy the initialization code from the code ROM 206*a* provided by the memory device(s) 206 to the main memory system 208 (e.g., DRAM device(s)). For example, FIG. 4B illustrates the BIOS sub-engine 204*b* (which may be provided by a chipset executing some of the initialization code in the code ROM 206*a* as discussed above) performing read operations 402*a* to read the initialization code from the code ROM 206*a*, and then performing write operations 402*b* to write that initialization code to the main memory system 208. However, while only initialization operations including a chipset providing the initialization engine/BIOS sub-engine 204*b* and the initialization engine/BIOS sub-engine copying initialization code to the main memory system 208 have been described, one of skill in the art in possession of the present disclosure will appreciate that other initialization operations may be performed at block 404 while remaining within the scope of the present disclosure as well.

As will be recognized by one of skill in the art in possession of the present disclosure, the initialization code stored in the code ROM 206*a* provided by the memory device(s) 206 (e.g., the BIOS code discussed above) may include "existing" microcode for which the microcode update discussed above was provided. For example, the existing microcode included in the initialization code stored in the code ROM 206*a* provided by the memory device(s) 206 may be microcode initially provided with that initialization code, and may have been found to result in vulnerabilities associated with the computing device 200 (e.g., Central Processing Unit (CPU) side channel vulnerabilities and/or other low-level firmware vulnerabilities known in the art), less than optimum performance of components (e.g., the CPU) in the computing device 200, bugs associated with the computing device 200, and/or in a variety of other issues known in the art that would prompt the microcode update discussed above to be generated and transmitted to the computing device 200. As such, the copying of the initialization code from the code ROM 206*a* provided by the memory device(s) 206 to the main memory system 208 may include the copying of existing microcode to the main memory system 208 as well.

The method 300 then proceeds to block 306 where the microcode update engine identifies the microcode update in the data region of the memory device(s) during initialization operations. In an embodiment, at block 306 and as part of the initialization operations being performed by the microcode update engine 204, the microcode update engine 204 may operate to identify the microcode update that was stored in the data region 206*b* provided by the memory device(s) 206. For example, the BIOS sub-engine 204*b* (e.g., provided by a Boot Strap Processor (BSP) in the processing system) may utilize the initialization code and existing microcode in the early stage of the initialization operations, and following the initialization of the main memory system 208, a microcode update portion of the initialization operations (e.g., a portion of the initialization operations in which updates to microcode may be provided for the cores in the processing system) may begin. In response to reaching the microcode update portion of the initialization operations, the BIOS sub-engine 204*b* may identify the microcode update in the data region 206*b* of the memory device(s) 206 by, for example, determining whether the UEFI variable to which the microcode update was written, or the data BLOB that includes the microcode update, is present in the data region 206*b* provided by the memory device(s) 206. However, while a few specific examples of the identification of a microcode update in a data region of a memory device have been described, one of skill in the art in possession of the present disclosure will appreciate that microcode updates in a data region of a memory device may be identified in a variety of manners that will fall within the scope of the present disclosure as well.

The method 300 then proceeds to decision block 308 where it is determined whether the microcode update should be applied. In an embodiment, at decision block 308, the microcode update engine 204 may operate to determine whether the microcode update identified at block 306 should be applied to the computing device 200. For example, the BIOS sub-engine 204b may be configured to provide a setup option for display to a user of the computing device 200 during its initialization that allows that user to determine whether the microcode update should be applied on the computing device 200 such that the updated microcode takes precedence over the existing microcode included in the initialization code discussed above. As such, in some embodiments of decision block 308, the BIOS sub-engine 204b may generate and provide a microcode setup option for display on a display device included on the computing device 200 (not illustrated, but which may include the display 110 discussed above with reference to FIG. 1) that allows the user to indicate (e.g., via a Graphical User Interface (GUI)) whether the microcode update should be applied. In other embodiments, the BIOS sub-engine 204b may default to applying microcode updates stored in the data region 206b of the memory device(s) 206, and thus the determination at decision block 308 may be a determination to perform the default microcode update operations in response to identifying the microcode update. However, while a few specific examples have been described, one of skill in the art in possession of the present disclosure will recognize that determinations of whether microcode updates should be applied may be performed in a variety of manners that will fall within the scope of the present disclosure as well.

If, at decision block 308, it is determined that the microcode update should not be applied, the method 300 proceeds to block 310 where the microcode update engine performs the initialization operations using existing microcode in the initialization code. In an embodiment, at block 310 and in response to determining that the microcode update should not be applied at decision block 308, the microcode update engine 204 may utilize the initialization code (including the existing microcode discussed above) in the main memory system to perform the initialization operations, thus applying the existing microcode to the computing device 200. For example, at decision block 308, the BIOS sub-engine 204b may receive an instruction from a user of the computing device 200 (e.g., via the GUI providing the microcode setup option discussed above) to not apply the microcode update that is stored in the data region 206b provided by the memory device(s) 206 and, in response, the BIOS sub-engine 204b may operate to ignore the microcode update stored in the data region 206b provided by the memory device(s) 206, and perform and complete the initialization operations using the initialization code and its existing microcode that was copied to the main memory system 208 as discussed above. As will be appreciated by one of skill in the art in possession of the present disclosure, following the performance and completion of the initialization operations, the computing device 200 may enter a runtime environment in which the OS sub-engine 204a takes over control of the computing device 200, and in which the BIOS sub-engine 204b may perform some runtime operations.

If at decision block 308, it is determined that the microcode update should be applied, the method 300 proceeds to decision block 312 where it is determined whether the microcode update is valid. In an embodiment, at decision block 312 and in response to determining that the microcode update should be applied at decision block 308, the microcode update engine 204 may operate to determine whether the microcode update stored in the data region 206b provided by the memory device(s) 206 is valid. For example, in response to the microcode update being present in the data region 206b provided by the memory device(s) 206 and a user instructing the application of that microcode update to the computing device 200, the BIOS sub-engine 204b may access information associated with the microcode update (e.g., a signature included in a header of a microcode update package that includes the microcode update), authenticate the microcode update (e.g., by verifying the signature included in the header of the microcode update package that includes the microcode update), confirm that the microcode update is a complete microcode update, perform compatibility checks to confirm that the microcode update is a proper/compatible microcode update that is applicable to the computing device 200 and/or its processing system, and/or perform any of a variety of other validation operations that would be apparent to one of skill in the art in possession of the present disclosure.

Figure 4C:
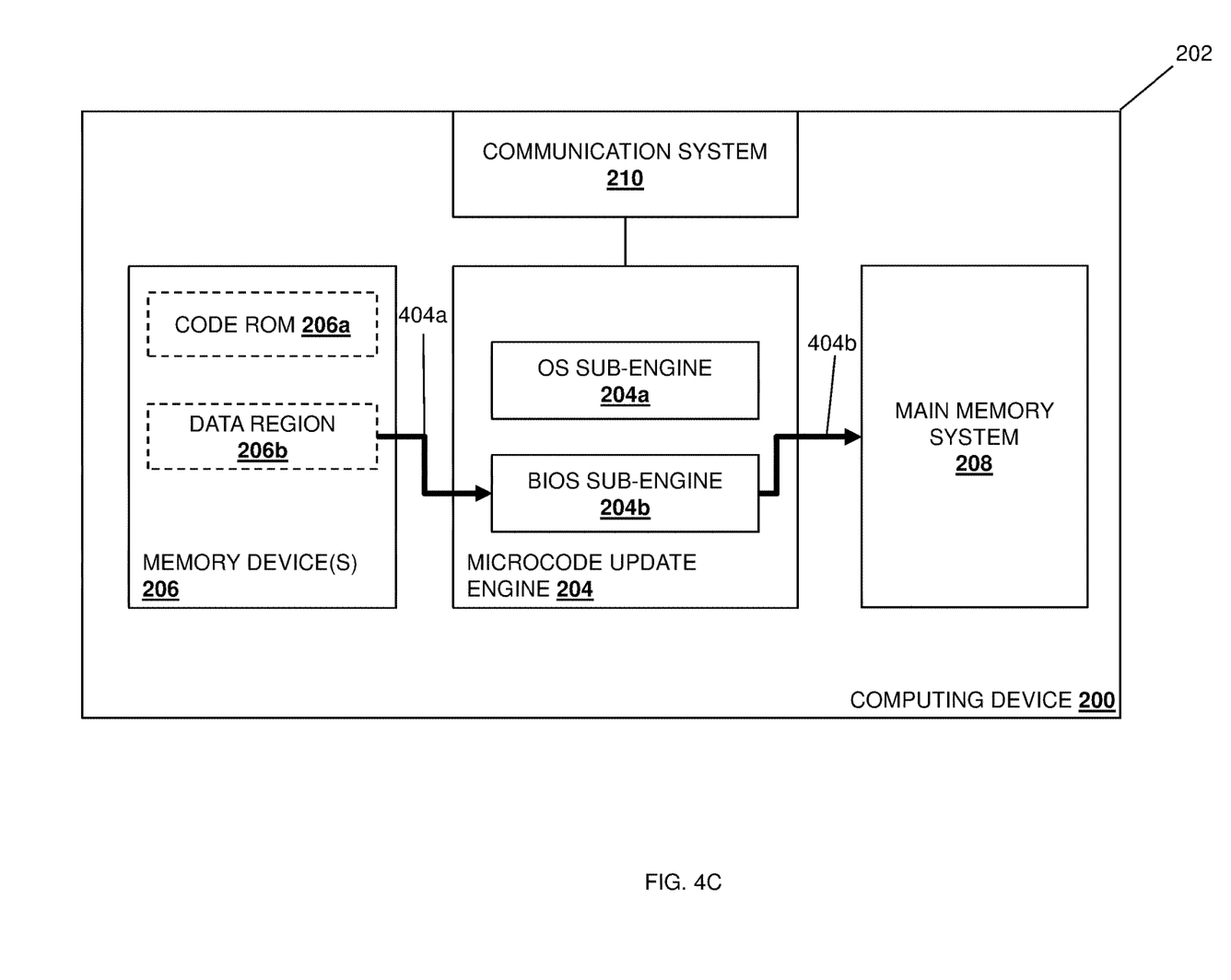
FIG. 4C is a schematic view illustrating an embodiment of the computing device of FIG. 2 operating during the method of FIG. 3.

If, at decision block 312, it is determined that the microcode update is valid, the method 300 proceeds to block 314 where the microcode update engine performs microcode update operations using the microcode update in the data region provided by the memory device(s). In an embodiment, at block 314 and in response to determining that the microcode update stored in the data region 206b provided by the memory device(s) 206 is valid, the microcode update engine 204 may operate to perform microcode update operations that include copying the microcode update from the data region 206b provided by the memory device(s) 206 to the main memory system 208. For example, FIG. 4C illustrates the BIOS sub-engine 204b performing read operations 404a to read the microcode update from the data region 206b provided by the memory device(s) 206, and performing write operations 404b to write the microcode update to the main memory system 208 (e.g., a DRAM device.) As discussed above, in some embodiments, the microcode update may be provided in a microcode update package, and thus at block 314 the BIOS sub-engine 204b may read and write the microcode update package from the data region 206b provided by the memory device(s) 206 to the main memory system 208. However, while specific microcode update operations are described above, one of skill in the art in possession of the present disclosure will appreciate that other microcode update operations and/or initialization operations may be performed at block 314 while remaining within the scope of the present disclosure as well.

The method 300 then proceeds to block 316 where the microcode update engine performs the initialization operations using the microcode update. In an embodiment, at block 316, the microcode update engine 204 may operate to perform the initialization operations using the microcode update. For example, at block 316, the BIOS sub-engine 204b may operate to call a CPU microcode update process that is configured to utilize the microcode update to update microcode utilized by the CPU included in the processing system, and the CPU may operate similarly as discussed above with reference to decision block 312 to access information in the microcode update (e.g., a signature included in a header of a microcode update package that includes the microcode update), authenticate the microcode update (e.g., by verifying the signature included in the header of the microcode update package that includes the microcode update), confirm that the microcode update is a complete microcode update, perform compatibility checks to confirm that the microcode update is a proper/compatible microcode update that is applicable to the computing device 200 and/or its processing system, and/or perform any of a variety of other validation operations that would be apparent to one of skill in the art in possession of the present disclosure.

In the event the CPU determines that the microcode update is valid, the CPU will operate to configure the CPU with the microcode update, and the BIOS sub-engine 204b will then perform any further initialization operations required to complete initialization such that the computing device 200 may enter a runtime environment and the OS sub-engine 204a may take over operations of the computing device 200. However, one of skill in the art in possession of the present disclosure will appreciate that while the application of a microcode update to a CPU has been described, the teachings of the present disclosure may apply to the updating of code on other subsystems in the computing device while remaining within the scope of the present disclosure as well. As such, following block 316, the computing device 200 may operate in a runtime environment with the CPU in its processing system configured to operate according to the microcode update. As will be appreciated by one of skill in the art in possession of the present disclosure, the user of the computing device 200 may be informed of a success in applying a microcode update via a variety of BIOS prompts/logs, remote access controller prompts/logs, and/or in any other manner that would be apparent to one of skill in the art in possession of the present disclosure.

In some embodiments, any new microcode update may be provided in the data region 206b provided by the memory device(s) 206 by overwriting a previous microcode update in the data region 206b provided by the memory device(s) 206 (with the existing/initial microcode provided with the initialization code remaining in the code ROM 206a provided by the memory device(s) 206.) However, in other embodiments, multiple microcode updates may be stored in the data region 206b provided by the memory device(s) 206, with the microcode update engine 204 configured to apply the microcode update that was most recently written to the data region 206b provided by the memory device(s) 206 over the previously written microcode updates, but also allowing a user to apply one of those previously written microcode updates if desired (e.g., using the microcode setup options discussed above.) Thus, the microcode update engine 204 may be configured to store multiple microcode updates in the data region 206b provided by the memory device(s) 206 when storage space is available, and erase microcode updates stored in the data region 206b provided by the memory device(s) 206 based on aging rules, storage requirements, and/or any other considerations that would be apparent to one of skill in the art in possession of the present disclosure.

If, at decision block 312, it is determined that the microcode update is not valid, the method 300 proceeds to block 318 where the microcode update engine erases the microcode update from the data region of the memory device(s). In an embodiment, at block 318 and in response to determining that the microcode update is not valid at block 312, the microcode update engine 204 may operate to erase the microcode update from the data region 206b provided by the memory device(s) 206. For example, at block 318, the BIOS sub-engine 204b may reject the microcode update, generate and display an error message (e.g., on a display device during the POST operations discussed above), and erase the microcode update (e.g., erase the UEFI variable or data BLOB in which that microcode update was stored) from the data region 206b provided by the memory device(s) 206. The method 300 then proceeds to block 310 where the microcode update engine performs the initialization operations using the existing microcode in the initialization code in substantially the same manner as discussed above.

As will be appreciated by one of skill in the art in possession of the present disclosure, in the event the CPU determines that the microcode update in not valid during the initialization operations at block 316, the CPU may reject the microcode update, generate and display an error message (e.g., on a display device during the POST operations discussed above), and erase the microcode update (e.g., erase the UEFI variable or data BLOB in which that microcode update was stored) from the data region 206b provided by the memory device(s) 206 in substantially the same manner as discussed above. As such, the user of the computing device 200 may be informed of a failure to validate a microcode update via a variety of BIOS prompts/logs, remote access controller prompts/logs, and/or in any other manner that would be apparent to one of skill in the art in possession of the present disclosure.

Thus, systems and methods have been described that provide for "standalone" microcode updates that are separate and distinct from BIOS engine updates, which allows for the updating of microcode in a computing device without the need to update the BIOS engine in that computing device, while also freeing users to update the BIOS engine in the computing device without requiring that the microcode in that computing device be updated as well. For example, an SPI flash memory device in the computing device may include a code ROM and a data region, and a microcode update engine coupled to the SPI flash memory device may receive a microcode update, and write the microcode update to the data region of the SPI flash memory device. Subsequently and in response to an initialization of the computing device, the microcode update engine may utilize BIOS code in the code region of the SPI flash memory device to perform initialization operations identify the microcode update in the data region of the SPI flash memory device during a microcode update portion of the initialization operations, and perform microcode update operations using the microcode update in the data region of the SPI flash memory device. As such, microcode updates may be provided for different computing device platforms within a computing device generation, and across computing device generations, without the need to generate BIOS engine updates for each computing device platform, while a user of the computing device may decline to update microcode (e.g., when doing so would reduce the performance of the computing device) when updating the BIOS engine for the computing device.

As will be understood by one of skill in the art in possession of the present disclosure, the systems and methods described herein allow for a secure and standalone update of microcode only using a data region of an initialization (e.g., an SPI flash) memory device, and treating the microcode update as a UEFI variable or data BLOB that is stored in the data region of that memory device, rather than provided as part of an initialization code update. As such, only a single microcode update package need be generated and released by computing device manufacturers in order to provide microcode updates for entire generations, platforms, and/or classes of computing devices, with signatures/certificates utilized to authenticate the microcode update package in order to ensure secure microcode updates. Furthermore, the provisioning of microcode updates in such a manner allows users of computing devices to choose to update the initialization engines on their computing devices without updating the microcode on these computing devices, which may be desirable in situations such as, for example, when the microcode update will produce some benefits for the computing device that are outweighed by performance impacts/degradation that will result in the computing device from the microcode update.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for updating microcode, comprising:
   receiving, by a microcode update engine provided via operation of a processing system in a computing device and without receiving an initialization engine code update for initialization engine code that is stored in a code region of at least one initialization memory device in the computing device and that is configured to provide an initialization engine, a microcode update for existing microcode that is included in the initialization engine code;
   writing, by the microcode update engine, the microcode update to a Unified Extensible Firmware Interface (UEFI) variable in a data region of the at least one initialization memory device that stores data utilized by the initialization engine during computing device initialization operations and computing device runtime operations;
   beginning, by the microcode update engine subsequent to writing the microcode update to the data region of the at least one memory device and utilizing the initialization engine provided by the initialization engine code that is stored in the code region of the at least one initialization memory device and that includes the existing microcode, computing device initialization operations;
   identifying, by the microcode update engine during a microcode update portion of the computing device initialization operations, the microcode update in the data region of the at least one initialization memory device;
   performing, by the microcode update engine, microcode update operations using the microcode update in the data region of the at least one initialization memory device; and
   completing, by the microcode update engine, the computing device initialization operations utilizing the initialization engine provided by the initialization engine code, and the microcode update in place of the existing microcode included in the initialization engine code.

2. The method of claim 1, further comprising:
   determining, by the microcode update engine in response to identifying the microcode update in the data region of the at least one initialization memory device, whether the microcode update should be applied in place of the existing microcode included in the initialization engine code; and
   performing, by the microcode update engine using the microcode update and in response to determining that the microcode update should be applied in place of the existing microcode included in the initialization engine code, any of a subset of the computing device initialization operations that have not yet been performed.

3. The method of claim 2, further comprising:
   performing, by the microcode update engine in response to determining that the microcode update should not be applied in place of the existing microcode included in the initialization engine code, the initialization operations using the existing microcode included in the initialization engine code.

4. The method of claim 1, further comprising:
   validating, by the microcode update engine prior to performing the microcode update operations using the microcode update in the data region of the at least one initialization memory device, the microcode update.

5. The method of claim 4, further comprising:
   erasing, by the microcode update engine in response to a failure in validating the microcode update, the microcode update from the UEFI variable in the data region of the at least one initialization memory device.

6. The method of claim 1, wherein the beginning the computing device initialization operations include copying the initialization engine code to a main memory system, and wherein the microcode update operations include copying the microcode update to the main memory system.

7. An Information Handling System (IHS), comprising:
   a processing system that includes at least one hardware processor that is configured to execute instructions that cause the processing system to provide a microcode update engine that is configured to:
   receive, without receiving an initialization engine code update for initialization engine code that is stored in a code region of at least one initialization memory device and that is configured to provide an initialization engine, a microcode update for existing microcode that is included in the initialization engine code;
   write the microcode update to a Unified Extensible Firmware Interface (UEFI) variable in a data region of the at least one initialization memory device that stores data utilized by the initialization engine during computing device initialization operations and computing device runtime operations;
   begin, subsequent to writing the microcode update to the data region of the at least one memory device and utilizing the initialization engine provided by the initialization engine code that is stored in the code region of the at least one initialization memory device and that includes the existing microcode, computing device initialization operations;
   identify, during a microcode update portion of the computing device initialization operations, the microcode update in the data region of the at least one initialization memory device;
   perform microcode update operations using the microcode update in the data region of the at least one initialization memory device; and
   complete the computing device initialization operations utilizing the initialization engine provided by the initialization engine code, and the microcode update in place of the existing microcode included in the initialization engine code.

8. The IHS of claim 7, wherein the microcode update engine is configured to:
   determine, in response to identifying the microcode update in the data region of the at least one initialization memory device, whether the microcode update should be applied in place of the existing microcode included in the initialization engine code; and perform, using the microcode update and in response to determining that the microcode update should be applied in place of the existing microcode included in the initialization engine code, any of a subset of the computing device initialization operations that have not yet been performed.

9. The IHS of claim 8, wherein the microcode update engine is configured to:

perform, in response to determining that the microcode update should not be applied in place of the existing microcode included in the initialization engine code, the microcode update operations using the existing microcode included in the initialization engine code.

10. The IHS of claim 7, wherein the microcode update engine is configured to:

validate, prior to performing the microcode update operations using the microcode update in the data region of the at least one initialization memory device, the microcode update.

11. The IHS of claim 10, wherein the microcode update engine is configured to:

erase, in response to a failure in validating the microcode update, the microcode update from the UEFI variable in the data region of the at least one initialization memory device.

12. The IHS of claim 7, wherein the beginning the computing device initialization operations include copying the initialization engine code to a main memory system, and wherein the microcode update operations include copying the microcode update to the main memory system.

* * * * *